United States Patent
Tanzer et al.

(10) Patent No.: US 6,461,743 B1
(45) Date of Patent: Oct. 8, 2002

(54) SMOOTH-SIDED INTEGRAL COMPOSITE ENGINEERED PANELS AND METHODS FOR PRODUCING SAME

(75) Inventors: Jay Tanzer; David C. Ritter, both of West Linn, OR (US)

(73) Assignee: Louisiana-Pacific Corp., Portland, OR (US)

( * ) Notice: Subject to any disclaimer, the term of this patent is extended or adjusted under 35 U.S.C. 154(b) by 0 days.

(21) Appl. No.: 09/641,550

(22) Filed: Aug. 17, 2000

(51) Int. Cl.$^7$ ............................................... B32B 21/02
(52) U.S. Cl. ..................... 428/535; 428/109; 428/425.1; 428/526; 428/528; 428/530; 428/537.5; 428/292.4; 428/292.7
(58) Field of Search .................................. 428/535, 109, 428/425.1, 526, 528, 530, 537.5, 292.4, 292.7

(56) References Cited

U.S. PATENT DOCUMENTS

| | | | |
|---|---|---|---|
| 2,343,470 A | 3/1944 | Nast ............................ 126/390 |
| 2,343,740 A | 3/1944 | Birmingham ................ 154/40 |
| 2,405,235 A | 8/1946 | Randall ...................... 154/45.9 |
| 2,545,603 A | 3/1951 | Byers .......................... 154/132 |
| 2,831,793 A | 4/1958 | Elmendorf .................. 154/45.9 |
| 2,979,105 A | 4/1961 | Burkner ......................... 154/1 |
| 3,098,781 A | 7/1963 | Greten ........................ 156/373 |
| 3,164,511 A | 1/1965 | Elmendorf .................... 161/57 |
| 3,171,872 A | 3/1965 | Jarrett et al. ................ 265/113 |
| 3,308,013 A | 3/1967 | Bryant ........................ 162/103 |
| 3,846,219 A | 11/1974 | Kunz ............................ 161/119 |
| 3,929,545 A | 12/1975 | Van Dyck et al. ........... 156/220 |
| 3,981,762 A | 9/1976 | Davis et al. ................. 156/322 |
| 4,035,120 A | 7/1977 | Eriksson ........................ 425/81 |
| 4,053,339 A | 10/1977 | Story et al. ................. 156/62.2 |
| 4,063,858 A | 12/1977 | Axer et al. .................... 425/81 |
| 4,068,991 A | 1/1978 | Ufermann et al. ............ 425/81 |
| 4,084,996 A | 4/1978 | Wheeler ....................... 156/257 |
| 4,104,429 A | 8/1978 | Colledge ..................... 428/151 |
| 4,122,236 A | 10/1978 | Holman ....................... 428/453 |
| 4,131,705 A | 12/1978 | Kubinsky .................... 428/106 |
| 4,175,148 A | 11/1979 | Luck et al. .................. 428/171 |
| 4,210,692 A | 7/1980 | Bohme ........................ 428/106 |
| 4,227,965 A | * 10/1980 | Luszczak ..................... 162/13 |
| 4,241,133 A | 12/1980 | Lund et al. .................. 428/326 |
| 4,246,310 A | 1/1981 | Hunt et al. .................. 428/106 |
| 4,258,103 A | 3/1981 | Hosmer et al. .............. 428/342 |
| 4,361,612 A | 11/1982 | Shanner et al. .............. 428/106 |
| 4,364,984 A | 12/1982 | Wentworth .................. 428/106 |
| 4,379,193 A | 4/1983 | Hunt ........................... 428/196 |
| 4,379,194 A | 4/1983 | Clarke et al. ................ 428/203 |
| 4,468,264 A | 8/1984 | Clarke et al. ............... 156/62.2 |
| 4,497,027 A | * 1/1985 | McGuire et al. ............ 364/471 |
| 4,505,974 A | 3/1985 | Hosler ......................... 428/329 |
| 4,552,792 A | 11/1985 | Julian et al. ................... 428/40 |
| 4,610,913 A | 9/1986 | Barnes ........................ 428/215 |
| 4,647,324 A | 3/1987 | Mtangi et al. .............. 156/62.2 |
| 4,898,788 A | 2/1990 | Minami et al. .............. 428/481 |
| 4,903,845 A | 2/1990 | Artiano ....................... 209/671 |
| 5,012,933 A | 5/1991 | Artiano ....................... 209/671 |
| 5,071,688 A | 12/1991 | Hoffman ..................... 428/106 |
| 5,089,348 A | 2/1992 | Louderback ................. 428/464 |
| 5,147,486 A | 9/1992 | Hoffman ..................... 156/154 |
| 5,369,303 A | 11/1994 | Wei ............................. 257/751 |
| 5,425,976 A | 6/1995 | Clarke et al. ................ 428/105 |
| 5,470,631 A | 11/1995 | Lindquist et al. ........... 428/105 |
| 5,525,394 A | 6/1996 | Clarke et al. ................ 428/105 |
| 5,554,429 A | 9/1996 | Iwata et al. .................. 428/105 |
| 5,702,558 A | 12/1997 | Schadel ....................... 156/323 |
| 5,716,563 A | 2/1998 | Winterowd et al. ........ 264/45.5 |
| 5,718,786 A | 2/1998 | Lindquist et al. .......... 156/62.2 |

\* cited by examiner

*Primary Examiner*—James J. Seidleck
*Assistant Examiner*—Melanie Bissett
(74) *Attorney, Agent, or Firm*—Marger Johnson & McCollom, P.C.

(57) ABSTRACT

A method is provided for forming a durable, smooth-sided, multi-layer integral, composite engineered panel. The method typically is directed to first forming a mat comprising a plurality of layers of lignocellulosic strands or wafers. The plurality of layers of lignocellulosic strands or wafers are bonded together by an adhesive material. Then, at least one layer of smaller particles of lignocellulosic material is formed on the mat. This layer of smaller particles is blended together with an adhesive material thereby joining the layer of smaller particles to at least one outer surface of the mat. Next, at least one sheet of paper is joined to an outer layer of smaller particles of lignocellulosic material. This step takes place during the formation of the multi-layer integral, composite engineered panel. Finally, a substantially smooth outer surface is formed, upon pressing, in at least one surfaces of the multi-layer integral, composite engineered panel.

41 Claims, No Drawings

SMOOTH-SIDED INTEGRAL COMPOSITE ENGINEERED PANELS AND METHODS FOR PRODUCING SAME

BACKGROUND OF THE INVENTION

This invention relates to process for producing an integral composite engineered panel product having at least one side which is substantially smooth, and more particularly, a durable, engineered wood composite product formed of lignocellulosic strands or wafers ("OSB") at least one outer surface of which remains substantially smooth despite exposure to wet and/or humid weather conditions.

Products such as fiberboard and particleboard have been found to be acceptable alternatives in most cases to natural wood paneling, sheathing and decking lumber. Fiberboard and particleboard are produced from wood particles bonded together by an adhesive, the adhesive being selected according to the intended use of and the properties desired for the lumber. Often times, the adhesive is combined with other additives to impart additional properties to the lumber. Additives can include fire retardants, insect repellants, moisture resistants, fungus resistants and color dyes. A significant advantage of fiberboard and particleboard lumber products is that they have many of the properties of plywood, but can be made from lower grade wood species and waste from other wood product production, and can be formed into lumber in lengths and widths independent of size of the harvested timber.

A major reason for increased presence in the marketplace of the above-described product alternatives to natural solid wood lumber is that these materials exhibit properties like those of the equivalent natural solid wood lumber, especially, the properties of retaining strength, durability, stability and finish under exposure to expected environmental and use conditions. A class of alternative products are multilayer oriented wood strand particleboards, particularly those with a layer-to-layer oriented strand pattern, such as OSB. Oriented, multilayer wood strand boards are composed of several layers of thin wood strands, which are wood particles having a length which is several times greater than their width. These strands are formed by slicing larger wood pieces so that the fiber elements in the strands are substantially parallel to the strand length. The strands in each layer are positioned relative to each other with their length in substantial parallel orientation and extending in a direction approaching a line which is parallel to one edge of the layer. The layers are positioned relative to each other with the oriented strands of adjacent layers perpendicular, forming a layer-to-layer cross-oriented strand pattern. Oriented, multilayer wood strand boards of the above-described type are described in detail in the following: U.S. Patents: U.S. Pat. No. 3,164,511, U.S. Pat. No. 4,364,984, U.S. Pat. No. 5,435,976, U.S. Pat. No. 5,470,631, U.S. Pat. No. 5,525,394, and U.S. Pat. No. 5,718,786, all of which are incorporated herein by reference.

Certain oriented board products can be made from flakes that are created from debarked round logs by placing the edge of a cutting knife parallel to a length of the log and the slicing thin flakes from the log. The cut flakes are subjected to forces that break the flakes into strands having a length parallel to the grain of the wood several times the width of the strand. The strands can be oriented on the board forming machine with the strands predominantly oriented in a single, e.g., cross-machine direction in one, e.g., core layer and predominantly oriented in the generally perpendicular (machine) direction in adjacent layers. The various layers are bonded together by natural or synthetic resin(s) under heat and pressure to make the finished product.

Oriented, multilayer wood strand boards of the above-described type are produced with bending, tensile strengths and face strengths comparable to those of commercial softwood plywood. However, the elongated wood strands forming oriented wood strand boards typically have an irregular contour and leave voids, as a result, form a rough surface finish. Even sanding the board surface may not result in producing smooth surface finishes on oriented wood strand boards comparable to those routinely produced on natural solid wood boards. To form a smooth surface on oriented wood strand boards, it has been suggested to place a layer of wood particle fines on the finish surface of the board. A multilayer wood particleboard can be manufactured, for example, having a core portion of at least two layers composed substantially of adhesively bonded wood strands, and at least one layer composed substantially of adhesively bonded wood fines bonded to cover an outer layer of the core portion to form a finished surface. The wood strands are distributed in each core layer with their length in substantial parallel orientation in a preferred direction. Furthermore, the adjacent layers of the core are positioned relative to each other with the oriented strands of each layer perpendicular to the oriented strands of the adjacent layer, to thereby form a layer-to-layer oriented strand pattern multilayer core structure. In some cases, one or more core layers may be randomly oriented.

A smooth outer surface can be created on board products by adding a sufficient layer of fine wood particles. In U.S. Pat. No. 4,364,984, for instance, the layer of fines is described as being composed of irregularly contoured wood particles of various sizes having a width and thickness considerably less than average width of the wood strands forming the core layers. This prior art invention requires that the fines be "graded" for uniform size, and that the distribution of these graded fines be specific. More specifically, the fines after being graded to form particle fractions of substantially uniform smaller or larger size, are formed into a fines layer in which the smallest sized particle fraction is located at a first major surface of the fines layer and largest sized particle fraction is located at a second major surface of the fines layer. The size of the fines particles located therebetween are of a graduated size, the graduated size of the particles ranging from smaller to larger from the first to the second major surface of the fines layer.

These fines typically are said to be defined as wood particles having a width and thickness less than 0.50 mm. However, with respect to the invention of the '984 patent, the term "fines" is used in the broader, more generically relative sense to define wood particles having an average width and thickness several times smaller than the average width of the wood strands used to form the associated core layers. These fines wood particles are distributed in an unoriented graduated size pattern from the outer surface to inner surface of the core-covering surface layer, with the progressively smaller or finer wood particles being distributed closer to the outer surface of the surface layer. With the fines distributed in this unoriented, graduated size pattern, the largest fines wood particles are in contact with the surface of the covered core layer of the multilayer board to provide more contacting surface area for bonding the surface layer of fines to the covered core layer. By increasing the surface area of contact at the interface between the covered core layer and surface layer, it is concluded that a much stronger bond is capable of being formed between the layers. By avoiding orientation of the fines wood particles, the particles are said to interlink to aid the adhesive in the creation of a strong bond between the fines forming the surface layer. By combining the unoriented, graduated size pattern of distribution of fines in the surface layers with the layer-to-layer oriented pattern of distribution of strands in the core layers of the multilayer wood particleboard structure it is concluded in U.S. Pat. No. 4,364,984 that the strength, durability, stability and finish properties typifying natural solid wood lumber can be produced in lumber made from such multilayer wood strandboard structures.

U.S. Pat. No. 4,068,991 discloses a particleboard, e.g., chipboard product that includes a continuous particle size gradient between a coarser particle core and a finer particle surface layer. Since the fines are discrete wood fibers, they do not consolidate into a tight surface, but rather, retain susceptibility to the ready entry of water and do not holdout paint to a satisfactory degree. The particle size gradient transition from one particle size to another can be continuous or step-wise.

Telegraphing is the protrusion through a veneer, plastic or paper outer covering, or a painted outer surface of one or more layers of wood, which make up the composite panel. One attempt to prevent telegraphing is described in U.S. Pat. No. 3,098,781. The '781 patent discloses a particleboard product made entirely from fine wood particles of graduated size. The product formed in the '781 patent has no distinct layered separation. The '781 patent produced a particleboard which supposedly has the advantage of accepting a covering of veneer, paper or plastic sheets without telegraphing the relatively irregular surface of the underlying particleboard. The covering is joined to the particleboard, after formation of the particleboard, in a subsequent manufacturing operation.

Products such as cedar-like siding have been sold which include a resin bonded outer covering of embossed paper adhered to one surface of an engineered wood product, such as OSB. The paper covering is embossed. Telegraphing is not a problem with respect herein since the strands or flakes which comprise this product are not readily visible through the covering if it is embossed.

One of the problems associated with the application of fines onto an OSB baseboard is achieving a strong bond at the interface between the OSB and the fines which is capable of resisting weathering. The '984 patent suggests that a strong bond can be achieved at the interface between an OSB product and a fines particle layer by manufacturing the OSB with the largest OSB flakes at the interface, and applying the layer of fines particles such that the longest fines are disposed at the interface. Similarly, U.S. Pat. No. 4,361,612 discloses that shorter fibers in the surface of an OSB product will degrade the bending strength of an OSB product. Further, the '612 patent teaches that a laminated wood product including a flakeboard core laminated to a wood veneer, a wet-process hardboard or a wet-process fiberboard covering, as in typical plywood practice, may need a core finishing operation on a drum sander to achieve a core surface capable of good bonding to the covering.

U.S. Pat. No. 3,308,013 suggests that a water-laid fiber sheet containing resin and having a high basis weight of dry fiber can be employed to mask defects in plywood, particleboard, and the like. These heavy papers have been used to produce medium density overlain plywood that has found application in road signs where the smooth surface accepts lettering and reflective laminates. High cost, limited embossability, poor weathering, and poor adhesion of coatings preclude the use of this product in siding applications.

It has heretofore been generally accepted by those skilled in the art that an OSB baseboard and a fiberboard covering will not form a good bond at their interface and that the differential in dimensional and elastic properties of the fiberboard and OSB materials will result in delamination because of moisture cycling due to weather conditions.

All of the U.S. patents cited above are incorporated herein by reference in their entirety.

SUMMARY OF THE INVENTION

The present invention relates to multi-layer integral, composite engineered panel having a durable, smooth outer face on at least one of its major surfaces, which remains substantially smooth despite exposure to wet or humid conditions. In this way, lower cost wood products, such as OSB, can be upgraded by having a smooth outer surface appearance in uses, which in the past have been the domain of lumber based virgin wood products. An example of a major market for this new type of product would be "engineered wall panels".

This invention overcomes problems in the manufacture of the above-described product, which are smooth, paintable and will not telegraph. As previously discussed, telegraphing is a condition where the texture of a multi-layer product is revealed through the smooth outer covering surface upon exposure to water or high humidity.

Panels of the type described herein such as OSB-based panels, on formation, have rough surfaces. These surfaces become even more irregular upon exposure to moisture due to uneven swelling of the strands or wafers which make up the panel structure. Such products are therefore unsuitable for use where, for example, a smooth exterior face is required. For instance, paintable surfaces, which are required to be smooth, include flat exterior panels, interior wall panels, furniture, etc.

Sanding greatly improves the initial surface smoothness, but individual strands or wafers, which form products similar to the panels of the present invention, will readily telegraph with exposure to water or high humidity. Furthermore, the major surfaces of these prior art products are not readily paintable due to both grain raise at time of painting and uneven paint sorption caused by severe vertical density variations across the panel surface.

As indicated above, applications of layers of fines in the form of wood fibers or particles have been tried in an effort to solve the aforementioned problems. This technique reduces the wafer telegraphing with moisture. However, the surface does not accept liquid finish well due to grain raising. Also, vertical density variations are inescapable, resulting in variable sorption of the liquid finish across the surface.

Resin-impregnated paper surfaces can be adhered to the surface of lignocellulosic products during the pressing step in an effort to provide finishable surfaces which somewhat reduce telegraphing. Such surfaces may be smooth as formed but may telegraph the wafer or strand shape on exposure to water and/or high humidity. Performance may be improved by first sanding the panel product and thereafter applying the paper to the sanded panel in a separate step. However, it has now been determined that these types of products do not meet the requirements for producing smooth multi-layer panels of the type described above with respect to retention of smoothness appearance under moderate to severe moisture exposure conditions. Furthermore, this approach requires higher cost multiple handling steps as compared to the present invention employs a lower cost, integrated method which is typically performed in a one-step process.

More specifically, a method is provided for forming a durable, smooth sided, multi-layer integral, composite engineered panel including outer layers having first and second major outer surfaces. The method typically is directed to first forming a mat comprising a plurality of layers of lignocellulosic strands or wafers. The mat includes outer layers having first and second major outer surfaces.

The plurality of layers of lignocellulosic strands or wafers are bonded together by an adhesive material. The amount of adhesive by which the lignocellulosic strands or wafers are bonded together is preferably at least about 2% by weight, more preferably, at least about 3% by weight, most preferably, at least about 4% by weight, based on the weight of the mat.

Preferably, the adhesive bonding material in the mat is a phenol-formaldehyde resin and/or an isocyanate resin. Typically, the isocyanate resin employed is a diisocyanate resin.

Then, at least one layer of smaller particles of lignocellulosic material, including outer layers having first and second major outer surfaces, is formed on the mat. This layer of smaller particles is blended together with an adhesive material thereby joining the layer of smaller particles to at least one of the first and second major outer surfaces of the mat. The amount of the adhesive material employed is preferably at least about 4% by weight, based on the weight of the smaller particles. The average size of the smaller particles is less than the average size of the particles of lignocellulosic material which comprise the mat. The smaller particles preferably have an average particle size of not more than about 2 mm, and more preferably an average particle size of not more than about 1 mm.

As previously described above, certain prior art inventions require that the fines be "graded" for uniform size, and that the distribution of these graded fines be specific. Contrarily, in the present invention, grading is optional. Thus, the subject method permits the smaller particles employed in the present invention to be selected from a group consisting of graded particles and ungraded particles, not merely formed of selectively graded particles as required by a number of prior art methods.

The panel preferably comprises from at least about 60% by weight up to about 95% by weight of the lignocellulosic strands or wafers in the mat, and from about 40% by weight to about 5% by weight of the small particles, more preferably comprises from at least about 65% by weight up to about 90% by weight of the lignocellulosic strands or wafers in the mat, and from about 35% by weight to about 10% by weight of the small particles.

Next, at least one sheet of flexible material, having first and second major outer surfaces, is joined to at least one of the first and second major outer surfaces of an outer layer of smaller particles of lignocellulosic material. This step takes place during the formation of the multi-layer integral, composite engineered panel. The sheet is typically impregnated with an adhesive material prior to joining the sheet to at least one of the first and second major outer surfaces of the mat to form the subject integral engineered panel.

Preferably, a sheet of paper is employed as the flexible material. The resin-impregnated sheet preferably has a paper basis weight of at least about 25 lbs. per ream, more preferably at least about 35 lbs. per ream, and most preferably at least about 50 lbs. per ream. The sheet also preferably has a weight of at least about 0.015 lbs./sq.ft., more preferably a weight of at least about 0.02 lbs./sq.ft., and most preferably a weight of at least about 0.03 lbs./sq.ft. The paper can also be pre-primed on its outer surface to further facilitate paintability.

Finally, a substantially smooth outer surface is formed, upon pressing, in at least one of the first and second major surfaces of the multi-layer integral, composite engineered panel. The substantially smooth state of that surface is maintained even when the multi-layer integral, composite engineered panel is exposed to water and/or high humidity conditions. Also, wafer/strand telegraphing is substantially eliminated so that the smooth outer surface is substantially devoid of that undesirable condition.

The panel of this invention is typically paintable. Moreover, when the step of painting the smooth outer surface is conducted, the resultant painted panel is produced without substantial grain raising thereof or wafer/strand telegraphing. In the manufacture of the above-described smooth-surface product of the present invention, there can also be a problem of "cupping" when a panel exits the press section. The presence of cupping creates an unsightly product that is difficult to market. The mats of this invention are formed of layers of strands or wafers, overlaid first with a layer of smaller particles, and having an outer layer which is a sheet of flexible material, typically paper, which is preferably impregnated with a bonding material. Cupping is likely to occur with any unbalanced construction such as with the panel of the present invention. Prior art methods, which include rebalancing the orientations of the various layers, have done little to reduce cupping.

It has now also been discovered that cupping of the smooth surface multi-layer lignocellulosic product of the present invention can be substantially eliminated by moisturizing the subject product. This invention encompasses a process for producing non-cupped board. In normal manufacture, non-cupped board is not attainable out of press. Boards exit the manufacturing process typically at less than 1% moisture and, after unitizing and strapping, the rate of moisture absorption is extremely slow. Although boards are strapped flat, there is little or no stress relaxation because so little moisture is absorbed into the stack. Thus, in our just-in-time economy, products may be unstrapped on the store's shelves within a matter of days or weeks, and therefore cupping will spring back in the board.

The panel is maintained at a moisture level sufficient to prevent cupping of the panel. The moisture level in the panel is preferably maintained at a level of at least about 3% by weight, more preferably at a level of at least about 4% by weight, and most preferably at a level of at least about 5% by weight, based on the weight of the panel. One way of accomplishing the formation of a non cupping panel is by exposing the panel, after formation, to high humidity. Another way to prevent cupping of the panel is by post press wetting of the panel, after formation, with a liquid wetting agent. A third approach to prevent cupping of the panel is by increasing the moisture level of the lignocellulosic particles in the mat. Moisture can also be added to prevent cupping of the panel by spraying moisture onto at least one of a plurality of locations in the mat during formation.

The foregoing and other objects, features and advantages of the invention will become more readily apparent from the following detailed description of a preferred embodiment of the invention.

DETAILED DESCRIPTION OF THE PRESENT INVENTION

The term "multi-layer lignocellulosic product", as used herein, can describe a number of lignocellulosic board products. A primary example of such a product is OSB. It can also be employed for products formed of lignocellulosic veneers such as plywood and the like.

The multi-layer lignocellulosic products of this invention can be prepared by application of an adhesive bonding material to lignocellulosic particles, chips or wafers, specifically wood particles, wood chips and lignocellulosic fibers, which are formed into layers. Adhesive is typically blended with the above lignocellulosic materials using rotary blenders to achieve thorough mixing and dispensing of the adhesives. Similarly, the method of the present invention and its attendant advantages can be achieved with respect to various forms of lignocellulosic starting material and is not limited to any particular form. The use of wood particles and wafers, for example, in the formation of a typical OSB product comprises the preferred environment for the method of the present invention.

Mixtures of lignocellulosic particles may be used. Typically, such materials are wood particles derived from wood and wood residues such as wood chips, wood fibers, shavings, veneers, wood wool, cork, bark, sawdust, and the like. Particles of other lignocellulosic material such as shredded paper, pulp or vegetable fibers such as corn stalks, straw, bagasse and the like may also be used. The adhesive bonding system of the present invention generally comprises an isocyanate polymer and/or a phenol-formaldehyde polymer resin. The adhesive bonding system can also be an isocyanate/latex copolymer or a phenol-formaldehyde/latex copolymer. The polymers, which form the adhesive bonding system, are typically in liquid form so that they can be applied directly to a major surface of a layer of lignocellulosic material. The polymer resins can be combined together prior to their application.

The aldehyde polymer resins can comprise thermosetting resins such as phenol-formaldehyde, resorcinol-formaldehyde, melamine-formaldehyde, urea-formaldehyde, modified lignosulfonates, urea-furfural and condensed furfuryl alcohol resins. The phenolic component can include any one or more of the phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substituent can vary widely, and it is only necessary that the substituent not interfere in the polymerization of the aldehyde with the phenol at the ortho- and/or para- positions. Substituted phenols employed in the formation of the phenolic resins include: alkyl-substituted phenols, aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 12 carbon atoms. Specific examples of suitable phenols include: phenol, 2,6 xylenol, o-cresol, m-cresol, p-cresol, 3,5-xylenol, 3-4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The isocyanate polymer may suitably be any organic isocyanate polymer compound containing at least 2 active isocyanate groups per molecule, or mixtures of such compounds. Generally, the isocyanate polymers employed in the method of this invention are those which have an isocyanato group functionality of at least about two. Preferably, this functionality ranges from 2.3 to 3.5 with an isocyanate equivalent of 132 to 135. The isocyanato functionality can be determined from the percent available NCO groups and the average molecular weight of the isocyanate polymer composition. The percent available NCO groups can be determined by the procedures of ASTM test method D1638.

The isocyanate polymers which can be employed in the method of the present invention can be those that are typically employed in adhesive compositions, including typical aromatic, aliphatic and cycloaliphatic isocyanate polymers. Representative aromatic isocyanate polymers include 2,4-tolylene diisocyanate, 2,6-tolylene diisocyanate, 4,4'-methylene bis(phenyl isocyanate), 1,3-phenylene diisocyanate, triphenylmethane triisocyanate, 2,4,4'-triisocyanatodiphenyl ether, 2,4-bis(4-isocyanatobenzyl) phenylisocyanate and related polyaryl polyiscocyanates, 1,5-naphthalene diisocyanate and mixtures thereof. Representative aliphatic isocyanate polymers include hexamethylene diisocyanate, xylylene diisocyanate, 1,12-dodecane diisocyanate and lysine ethyl ester diisocyanate. Representative cycloaliphatic isocyanate polymers include 4,4'-methylenebis (cyclohexyl isocyanate), 1,4-cyclohexylene diisocyanate,1-methyl-2,4-cyclohexylene diisocyanate and 2,4-bis(4-isocyanatocyclhexylmethyl) cyclohexyl isocyanate. The isocyanate polymer is typically applied in its liquid form. Generally, when a phenol-formaldehyde resin is used as the phenolic resin it is present in the adhesive composition used in the method of the present invention within the range of about 50 to 90% by weight, preferably within the range of about 60 to 80% by weight of the total amount of adhesive. Generally, the isocyanate polymer is present in an amount of about 5% to 40% isocyanate polymer, preferably 10 to 35% isocyanate polymer, and most preferably 15 to 30 % isocyanate polymer, by weight. When the adhesive bonding system is used according to these percentages, one achieves a commercially attractive combination of desired board properties and economic advantages.

The adhesive can be applied to the wafers or strands by any conventional means such as by spray coating. The adhesive may be applied to the fines by known procedures such as paddle-type blenders or the like. Adhesive compositions may vary between respective layers of strands or wafers, or between respective layers of strands or wafers and fines, in order to achieve the best balance of adhesion and product properties.

The formation of the layers of strands or wafers from lignocellulosic materials can involve the application of an adhesive bonding composition to the lignocellulosic particles with subsequent application of heat and pressure to form the layers into its desired consolidated configuration. It should be appreciated that the adhesive composition can be applied to the lignocellulosic particles in any conventional means, such as spray coating of the adhesive composition onto the lignocellulosic particles. Smooth, paintable waferboard panels typically comprise 60–90% by weight lignocellulosic wafers blended with at least 3% by weight MDI or 4% by weight PF resin, and 10–40% wood fiber fines or particles, with at least about 5% by weight MDI or PF resin, distributed on the surface of the wafers, and a resin-impregnated paper of at least 28 lbs/ream on top of the fines surface. For an example, a 7/16" panel is produced using aspen wafers of 0.023" thickness which have been blended with 6% MDI in a conventional rotating OSB blender. Wafers are formed into three layers. Bottom and top layers each comprise 25% of the total and are oriented in the machine direction. The core layer comprises 50% and is random. Total weight of wafers is 1.0 lbs./sq.ft. Aspen fines are blended with 10% MDI in a particleboard blender. About 0.4 lbs./sq.ft of the blended fines is distributed onto the surface of the wafers. A 90 lb/ream PF-resin impregnated paper weighing 0.08 lbs. sq. ft is placed on top of the fines layers. The formed mat is now pressed at 420 deg. F. to form the finished board. Paintability was excellent. The panel was subjected to 8 weeks exposure to 120 deg. F and 90% humidity. Inspection of the surface showed essentially no telegraphing visually, and a dial gauge measurement across the surface showed less than 0.001 inches maximum bump.

Boards were also subjected to exterior exposure involving wet and dry weather cycles over a period of three months. The surface remained extremely smooth even without painting during these extreme exposure conditions. Control boards made with paper but without fines showed wafer telegraphing as pressed which deteriorated severely on exposure to high humidity and/or wetness. Control boards which were made with fines but not paper were smooth as pressed but exhibited surface fuzziness and grain raise upon exposure to high humidity even when painted.

The product employed is "smooth OSB" as described in the example below, but which in addition contains at least 4% moisture when unitized and stacked. Water may be introduced in several ways. For example, board surfaces may be exposed to high humidity for sufficient time before stacking and strapping. A faster embodiment is to add water to the board surfaces while still hot after the press; the water may contain surfactant to accelerate absorption. A third embodiment is to start with wetter flakes during forming, eg, 8–12% moisture vs 3–6% typically. A preferred embodiment is to concentrate the high moisture in the core or lower layers, either by selective flake drying, or by spray bar application on the forming line. We have discovered that this embodiment allows pinpointing moisture for maximum effect on cupping, and also provides more flexibility to prevent blows.

For example, a 7/16" panel is produced using aspen wafers having 4% moisture which have been blended with 6% MDI resin. Wafers are formed into 3 layers. Bottom and top layers each comprise 25% and are oriented in machine direction. Core layer comprises 50% and is formed randomly. Total weight of wafers is 1.0 lbs/sq.ft. Aspen fines are blended with 10% MDI in a particleboard blender. About 0.4 lbs/sq.ft. of the blended fines is distributed onto the surface of the wafers. A 90 lb/ream PF-resin impregnated paper weighing 0.08 lbs/sq.ft is placed on top of the fines layer. The formed mat is now pressed at 420 deg. F. to form the finished board.

Water was introduced in several different ways, either after panels were produced, or during the construction of the panels as described below. Exposure to high humidity. In this embodiment, the panel was made from typically dried wafers containing ~4% moisture. After pressing, board moisture was less than 1%. The panel cupped severely after the press and cupped even further overnight. Moisture was still less than 1%. The panel was placed in a 120° F./90% RH environment to accelerate moisture absorption. Cupping continued to increase and reached a peak at 2% moisture absorption. Over about the next 30 hours, moisture continued to increase and cupping decreased, becoming negligible at about 4% moisture. The spike in cupping indicates that moisture is preferentially coming in the back, causing expansion there, and must make its way to the top of the board before it can counteract and overcome this expansion effect.

Post-press wetting of boards. Boards made as described in above example were re-heated to 325 deg. F. to simulate boards moving down the production line right after pressing. Boards were severely cupped before and remained so after the re-heating. A 0.25% surfactant solution in water was rolled onto each surface three times. Moisture pickup was about 5%. Boards were stacked and strapped allowing moisture to equilibrate through the board thickness. After 1 week, boards were unstrapped. Moisture was slightly lower at about 4%. Cupping was negligible. Control boards which were not wetted, but which were strapped the same way, remained severely cupped after unstrapping.

High moisture flake. Boards were made as above but from flake containing 12% moisture. Cupping was less than half that of boards made at 4% moisture. High moisture flake made by adding moisture to specific zones in the mat. In this preferred embodiment, incoming flake was at 8% moisture. Moisture was sprayed onto various layers of wafers during forming, resulting in average board moisture content of about 12%. Boards ended up at 3–6% moisture after pressing. The location of the added water was surprisingly critical. Cupping was progressively reduced as we sprayed lower. Thus cupping was negligible when the added 4% water was applied to the top of the bottom layer. Cupping was acceptable but not as good when the water was added on top of the core layer. Cupping deteriorated further when the water was sprayed on top of the top wafer layer, and was even worse when sprayed on top of the fines layer.

While certain advantageous embodiments have been chosen to illustrate the invention, it will be understood by those skilled in the art that various changes and modifications as can be made therein without departing from the scope of the invention as described in the appended claims.

What is claimed is:

1. A smooth-sided, multi-layer, integral, composite engineered panel having outer surfaces, which comprises:
   a plurality of layers comprising lignocellulosic strands or wafers having outer surfaces, said plurality of layers being bonded together by an adhesive material;
   at least one layer of smaller particles of lignocellulosic material bonded together by an adhesive material, said layer of smaller particles of lignocellulosic material joined to at least one of the outer surfaces of the plurality of layers, the average size of said lignocellulosic smaller particles being less than the average size of the lignocellulosic strands or wafers in the plurality of layers; and
   at least one sheet of paper, each said paper sheet being joined to said layer of smaller particles of lignocellulosic material during the formation of the engineered panel,
   at least one of said surfaces of said engineered panel having a substantially smooth outer surface which is maintained in said substantially smooth state when exposed to water or high humidity conditions, each said substantially smooth outer surface of said engineered panel being substantially devoid of telegraphing.

2. The panel of claim 1, wherein the amount of adhesive by which the strands or wafers of lignocellulosic are bonded together in the plurality of layers is at least about 2% by weight, based on the weight of said plurality of layers.

3. The panel of claim 1, wherein the adhesive bonding material in said plurality of layers is an aldehyde and/or an isocyanate resin.

4. The panel of claim 1, wherein the adhesive bonding material in said plurality of layers is a diisocyanate.

5. The panel of claim 4, wherein amount of said diisocyanate in said plurality of layers is at least about 2% by weight based on the weight of said plurality of layers.

6. The panel of claim 1, wherein said smaller particles are selected from a group consisting of both graded particles and ungraded particles.

7. The panel of claim 1, wherein said smaller particles have an average particle size of not more than about 2 mm.

8. The panel of claim 1, wherein said sheet is impregnated with an adhesive material prior to joining said sheet to each layer of smaller particles.

9. The panel of claim 1, wherein said sheet has a basis weight of at least about 25 lbs per ream.

10. The panel of claim 1, wherein the weight of said sheet is at least about 0.015 lbs/sq.ft.

11. The panel of claim 1, wherein said substantially smooth outer surface of said panel is paintable without undergoing substantial grain raising.

12. The panel of claim 1, which is painted without undergoing substantial grain raising of said substantially smooth outer surface.

13. The panel of claim 1, which is maintained at a moisture level sufficient to prevent cupping thereof.

14. The panel of claim 13, wherein the moisture of said panel is at a level of at least about 3% by weight based on the weight of said panel.

15. The panel of claim 1, which comprises from about 60% by weight up to about 95% by weight of said lignocellulosic particles in said plurality of layers, and from about 5% by weight up to about 40% by weight each layer of said small particles.

16. The panel of claim 1, wherein said substantially smooth outer surface is paintable without substantial vertical density variations resulting in substantial variable sorption of the liquid finish across the outer surface of the panel.

17. The panel of claim 1, which is painted without substantial vertical density variations resulting in substantial variable sorption of the liquid finish across the outer surface of the panel.

18. A method for forming a smooth-sided, multi-layer, integral, composite engineered panel including outer surfaces, which comprises:

forming a plurality of layers comprising lignocellulosic strands or wafers having outer surfaces, said plurality of layers being bonded together by an adhesive material;

forming at least one layer of smaller particles of lignocellulosic material bonded together by an adhesive material, said layer of smaller particles of lignocellulosic material joined to at least one of the outer surfaces of the plurality of layers, the average size of said lignocellulosic smaller particles being less than the average size of the lignocellulosic strands or wafers in the plurality of layers; and providing at least one sheet of paper;

joining each said paper sheet to said layer of smaller particles of lignocellulosic material during the formation of the engineered panel; and forming on at least one of said surfaces of said engineered panel a substantially smooth outer surface which is maintained in said substantially smooth state when exposed to water or high humidity conditions, each said substantially smooth outer surface of said engineered panel being substantially devoid of telegraphing.

19. The method of claim 18, wherein the amount of adhesive by which the lignocellulosic strands or wafers which are bonded together in the plurality of layers is at least about 2% by weight, based on the weight of said plurality of layers.

20. The method of claim 18, wherein the adhesive bonding material in said plurality of layers is an aldehyde and/or an isocyanate resin.

21. The method of claim 18, wherein the adhesive bonding material in said plurality of layers is a diisocyanate.

22. The method of claim 18, wherein amount of said diisocyanate said plurality of layers is at least about 2% by weight based on the weight of said mat.

23. The method of claim 18, wherein said smaller particles have an average particle size of not more than about 2 mm.

24. The method of claim 18, wherein said smaller particles are selected from a group consisting of both graded particles and ungraded particles.

25. The method of claim 18, wherein said smaller particles have an average particle size of not more than about 3 mm.

26. The method of claim 18, wherein said sheet is impregnated with an adhesive material prior to joining said sheet each layer of smaller particles.

27. The method of claim 18, wherein said sheet has a basis weight of at least about 25 lbs per ream.

28. The method of claim 18, wherein the weight of said sheet is at least about 0.015 lbs/sq.ft.

29. The method of claim 18, where the panel is paintable without substantially grain raising of said substantially smooth outer surface of said panel.

30. The method of claim 18, which includes the step of painting said substantially smooth outer surface without substantial grain raising thereof.

31. The method of claim 18, which includes the step of maintaining the amount of moisture in said panel at a level sufficient to prevent cupping of said panel.

32. The method of claim 31, wherein the moisture level in said panel is at a level of at least about 3% by weight based on the weight of said panel.

33. The method of claim 18, where the panel comprises from about 60% by weight up to about 95% by weight of said lignocellulosic particles in said plurality of layers, and from about 5% by weight up to about 40% by weight each layer of said small particles.

34. The method of claim 31, which further includes the step of maintaining the moisture in said panel at a level sufficient to prevent cupping of said panel by exposing said panel, after formation, to high humidity.

35. The method of claim 31, which further includes the step of maintaining the moisture in said panel at a level sufficient to prevent cupping of said panel by post press wetting of said panel, after formation, with a liquid wetting agent.

36. The method of claim 31, which further includes the step of maintaining the moisture in said panel at a level sufficient to prevent cupping of said panel by increasing the moisture level of said lignocellulosic particles in said plurality of layers.

37. The method of claim 31, which further includes the step of maintaining the moisture in said panel at a level sufficient to prevent cupping of said panel by introducing additional moisture to one or more locations in said plurality of layers.

38. The method of claim 31, which further includes the step of maintaining the moisture in said panel at a level sufficient to prevent cupping of said panel by spraying moisture onto at least one of said locations in said plurality of layers.

39. The method of claim 18, wherein said substantially smooth outer surface is paintable without substantial vertical density variations resulting in substantial variable sorption of the liquid finish across the outer surface of the panel.

40. The method of claim 18, which further includes the step of painting said panel without substantial vertical density variations resulting in substantial variable sorption of the liquid finish across the outer surface of the panel.

41. A method for forming a smooth-sided, multi-layer, integral, composite engineered panel including outer surfaces, which comprises:

forming a plurality of layers comprising lignocellulosic particles having outer surfaces, said plurality of layers being bonded together by an adhesive material;

forming at least one layer of smaller particles of lignocellulosic material bonded together by an adhesive material, said layer of smaller particles of lignocellulosic material joined to at least one of the outer surfaces of the plurality of layers, the average size of said lignocellulosic smaller particles being less than the average size of the lignocellulosic particles in the plurality of layers; and providing at least one sheet of paper;

joining each said paper sheet to a layer of smaller particles of lignocellulosic material during the formation of the engineered panel, said paper sheet being impregnated with an adhesive material prior to joining said sheet to said layer of smaller particles; and forming on at least one of said surfaces of said engineered panel a substantially smooth outer surface which is maintained in said substantially smooth state when exposed to water or high humidity conditions, each said substantially smooth outer surface of said engineered panel being substantially devoid of telegraphing and paintable without substantial vertical density variations resulting in significant variable sorption of the liquid finish across the outer surface of the panel.

\* \* \* \* \*